Sept. 9, 1924.
J. F. O'CONNOR
1,508,027
FRICTION SHOCK ABSORBING MECHANISM
Original Filed Sept. 8, 1921
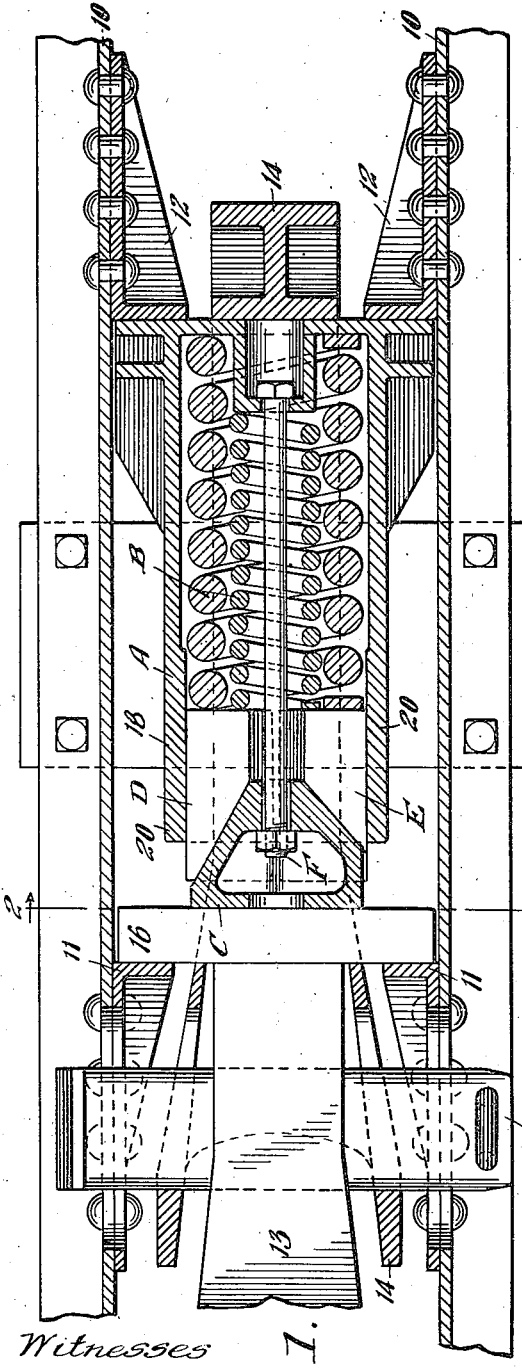
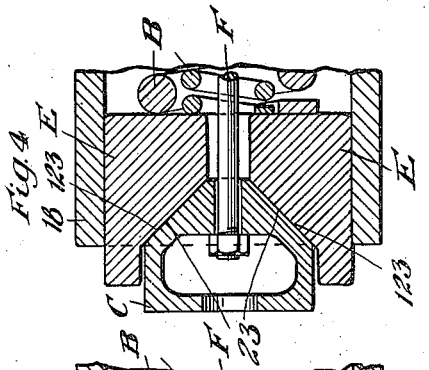
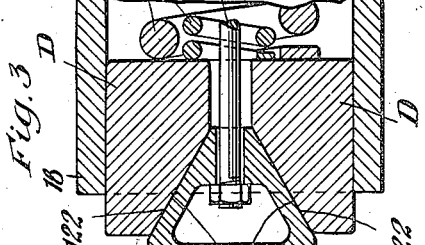
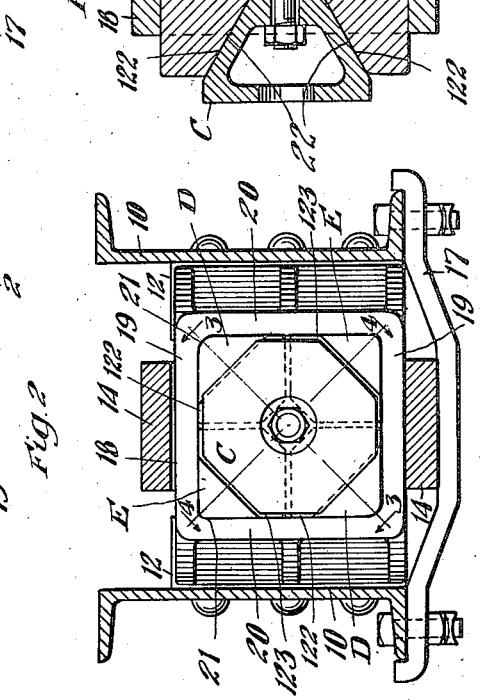
Witnesses
Wm. Geiger
Inventor
John F. O'Connor
By Geo. J. Haight
His Atty.

Patented Sept. 9, 1924.

1,508,027

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 8, 1921, Serial No. 499,205. Renewed July 21, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein are obtained high capacity and certain release, the friction-creating elements being of simple economical construction and few in number.

A more specific object of the invention is to provide a mechanism of the character indicated wherein two substantially independently functioning sets of friction-creating elements, having different characteristics, are employed in substantially twin arrangement.

In the drawing forming a part of this specification, Figure 1 is a horizontal longitudinally extending section of a portion of a railway draft rigging showing my improvements in connection therewith. Fig. 2 is a vertical transverse sectional view corresponding substantially to the line 2—2 of Fig. 1. And Figs. 3 and 4 are longitudinal sectional views of the shock absorbing mechanism proper, with parts broken away, corresponding to the diagonal section lines 3—3 and 4—4 respectively, of Fig. 2.

In said drawing, 10—10 denote channel draft sills of a railway car to the inner faces of which are secured front stop lugs 11—11 and rear stop lugs 12—12. A portion of a draw bar is indicated at 13 the same being operatively associated with the shock absorbing mechanism proper by a hooded cast yoke 14 and coupler key 15. The shock absorbing mechanism proper and a front follower 16 are disposed within the yoke and together with the latter are supported in operative position by a detachable saddle plate 17.

The shock absorbing mechanism proper, as shown, comprises, broadly, a combined friction shell and spring cage casting A; a spring resistance B; a wedge C; a pair of friction-shoes D—D; another pair of friction shoes E—E; and a retainer bolt F.

The casting A, as shown, is formed at its front or outer end with a rectangular shell proper 18 having upper and lower walls 19—19 and side walls 20—20, the same providing interior longitudinally extending corresponding flat friction surfaces. Where the walls 19 and 20 join, the shell is preferably provided with interior corner fillets 21—21, as shown best in Fig. 2. The rear portion of the casting A provides the cage for the spring resistance B. The rear wall of the casting A is laterally extended and suitably reinforced so as to adapt it to function as the rear follower of the mechanism.

The wedge C is preferably in the form of a hollow casting, as shown, and is provided with four inwardly converging faces, thus producing a wedge of substantially pyramidal form. Two of said wedge faces, which are disposed diagonally opposite each other, as indicated at 22 in Fig. 3 extend at a relatively acute angle with respect to the axis of the mechanism. On the remaining diagonally disposed sides, the wedge C is provided with wedge faces 23—23 as indicated in Fig. 4 that extend at a relatively blunt angle with respect to the axis of the mechanism and forces applied substantially parallel thereto.

The friction shoes D—D are arranged to cooperate with the wedge faces 22, each shoe D having a corresponding wedge face 122 as shown in Fig. 3. Similarly the shoes E are provided with wedge faces 123 cooperable with the wedge faces 23.

The shoes D and E are symmetrically arranged with respect to the axis of the shell and in the corners of the latter so that each shoe D has two outer longitudinally extending friction surfaces extending substantially at right angles to each other and cooperable with the inner friction surfaces of two walls 19 and 20 of the shell. The wedge faces 22 and 122, 23 and 123 are arranged in planes perpendicular to the planes coinciding with the diagonals of the shell, as best shown by the section lines 3—3 and 4—4 of Fig. 2 so that, as pressure is exerted from the wedge to the shoes, the shell will tend to expand diagonally. On account of the keener angles of the faces 22 and 122, the tendency to expand radially along the section lines 3—3 of Fig. 2 will be greater than along the section line 4—4.

All four friction-shoes D and E normally bear on the spring resistance B so that, at the beginning of the compression stroke resistance is afforded all shoes. It will be evident that the two shoes D—D in conjunction with the wedge C may be considered as one system of friction elements having a keen angle wedge characteristic and that the other shoes E—E in conjunction with the wedge C may be considered as a second system having a blunt angle wedge characteristic. Obviously, the two said systems operate in the manner of a twin device but within the same friction shell. It will, furthermore, be noted that all of the wedge faces 22, 122, 23 and 123 are so located that they may be intersected by a single plane extending perpendicular to the axis of the machanism.

In the operation of the device, during buff or draft, the front follower 16 and the shell A relatively approach each other, and the wedge C travels inwardly of the shell, while movement of the shoes D and E is resisted by the spring B. Due to the keen wedging angle between the wedge C and the shoes D, and the relatively blunt wedging angle between the wedge C and the shoes E, a wedging action is set up between the wedge and the shoes D, but there is no substantial wedging action set up between the shoes E and the wedge C. Shoes E and the wedge C move inwardly substantially as a unit, and as the shoes E will be advanced inwardly of the shell to a slightly greater extent than the shoes D, a slight spacing of the spring B with reference to the shoes D will result and the inward movement of the latter will no longer be opposed by the spring. The frictional resistance set up by the initial wedging action between the shell and the shoes D, being considerably greater than the resistance of the spring B, offers sufficient opposition to the inward movement of said shoes to produce the desired wedging action between shoes D and the wedge C. During the wedging action, the shell will expand along the diagonal section line 3—3.

During release, the tendency of the shell to contract produces inwardly directed lateral pressure on the shoes, and the wedging faces thereof act reversely to the action previously described, the co-acting wedge faces of the shoes E and the wedge C being keen wedge acting with reference to the forces acting at right angles to the direction of the actuating forces during buff and draft, whereby the wedge C is forced outwardly and the wedging pressure of the shoes D released, permitting the spring resistance B to restore all the parts to normal position.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of a spring resistance; two sets of friction-shoes each comprising a plurality of shoes and all cooperable with said shell; and a wedge common to all of said shoes, said wedge and shoes of one set having inwardly converging wedge faces extending at one angle with respect to the axis of the mechanism, said wedge and shoes of the other set having cooperating inwardly converging wedge faces extending at a different angle with respect to said axis.

2. In a friction shock absorbing mechanism, the combination with a friction shell; of a spring resistance; two sets of friction-shoes each comprising a plurality of shoes and all cooperable with said shell; and a wedge common to all of said shoes, said wedge and shoes of one set having wedge faces extending at one angle with respect to the axis of the mechanism, said wedge and shoes of the other set having cooperating wedge faces extending at a different angle with respect to said axis, all of said wedge faces converging in a common direction and being so located that a plane perpendicular to the axis will intersect all of them.

3. In a friction shock absorbing mechanism, the combination with a friction shell; of a spring resistance; two sets of friction-shoes each comprising a plurality of shoes and all cooperable with said shell; and a wedge common to all of said shoes, said wedge and shoes of one set having wedge faces extending at one angle with respect to the axis of the mechanism, said wedge and shoes of the other set having cooperating wedge faces extending at a different angle with respect to said axis, all of said shoes at their inner ends bearing on the adjacent end of the spring resistance.

4. In a friction shock absorbing mechanism, the combination with a main follower; of a friction shell; a spring resistance; a centrally disposed pressure-transmitting wedge directly engaged by said follower; and a series of friction-shoes cooperable with said wedge and arranged around the latter, alternate shoes having relatively keen angle wedge-engagement with the wedge, and the remaining shoes relatively blunt wedge-angle-engagement therewith.

5. In a friction shock absorbing mechanism, the combination with a substantially rectangular friction-shell having longitudinally extending interior friction surfaces;

of a spring resistance; a wedge friction-shoe in each corner of the friction-shell, one pair of diagonally opposite shoes having wedge faces extending at one angle with respect to the axis of the mechanism, the other diagonally opposite shoes having wedge faces extending at a different angle with respect to the axis of the mechanism; and wedge means cooperable with all of said shoes.

6. In a friction shock absorbing mechanism, the combination with a substantially rectangular friction-shell having longitudinally extending interior friction surfaces; of a spring resistance; a wedge friction-shoe in each corner of the friction-shell, one pair of diagonally opposite shoes having wedge faces extending at one angle with respect to the axis of the mechanism, the other diagonally opposite shoes having wedge faces extending at a different angle with respect to the axis of the mechanism; and a single wedge having faces corresponding to the different wedge faces of the shoes and cooperable with the latter.

7. In a friction shock absorbing mechanism, the combination with a friction-shell; of twin arranged sets of cooperable relatively keen and relatively blunt-angle wedge-face-friction-shoes and pressure-transmitting wedge means cooperable therewith within the shell; and a spring resistance common to both sets of the friction-shoes for yieldingly resisting relative movement between the shell and the shoes.

8. In a friction shock absorbing mechanism, the combination with a friction shell having interior friction surfaces; of a spring resistance; a series of four friction shoes slidable within said shell and arranged in a series; and a movable wedge acting between said shoes, two of said shoes having inner faces disposed at a keen angle with reference to the axis of the mechanism and coacting with similar inclined faces of said wedge member, and the remaining shoes having inner faces disposed at a relatively blunt angle to said axis and coacting with similarly inclined faces on said wedge member, all of said faces converging in a common direction.

9. In a friction shock absorbing mechanism, the combination with a friction shell having interior friction surfaces; of a series of friction shoes within the shell cooperating with the friction surfaces thereof; a spring resistance; spreader means cooperable with said shoes, said shoes and spreader means having a plurality of cooperating sets of faces converging in a common direction, two sets of which are disposed at relatively keen angles with reference to the longitudinal axis of the mechanism and the remaining sets of which are disposed at relatively blunt angles with reference to the axis of the mechanism.

10. In a friction shock absorbing mechanism, the combination with a friction shell having interior friction surfaces; of a spring resistance; wedge pressure transmitting means; and an even number of friction shoes cooperable with said shell surfaces, certain of said shoes and said means having cooperating sets of engaging faces inclined inwardly at a relatively acute and wedging angle with respect to forces applied substantially parallel to the axis of the shell, the remaining shoes and said means having cooperating sets of faces inclined inwardly to the axis of the mechanism at a blunter angle.

11. In a friction shock absorbing mechanism, the combination with a friction shell having interior friction surfaces; of an even number of friction shoes cooperable with said shell and arranged in series; a spring resistance; and spreader means cooperable with said shoes, said shoes and spreader means having a plurality of cooperating sets of faces, part of which are arranged at a relatively keen wedge acting angle and others of which are arranged at a relatively blunt releasing angle, certain of said blunt and keen shoes being disposed adjacent each other.

In witness that I claim the foregoing I have hereunto subscribed my name this 27th day of Aug. 1921.

JOHN F. O'CONNOR.

Witnesses:
CARRIE GAILING,
UNA C. PERIN.